United States Patent [19]

Lee

[11] Patent Number: 5,103,771
[45] Date of Patent: Apr. 14, 1992

[54] QUICK RELEASE ANIMAL LEASH

[76] Inventor: Paul F. Lee, 6705 W. 82nd St., Overlans Park, Kans. 66204

[21] Appl. No.: 696,237

[22] Filed: May 6, 1991

[51] Int. Cl.$^5$ ............................................. A01K 27/00
[52] U.S. Cl. ..................................... 119/110; 119/109
[58] Field of Search ............... 119/106, 109, 111, 114, 119/110

[56] References Cited

U.S. PATENT DOCUMENTS

| | | | |
|---|---|---|---|
| 1,500,488 | 7/1924 | Deatrick | 119/110 |
| 3,099,250 | 7/1963 | Soles, Jr. | 119/114 |
| 3,540,089 | 11/1970 | Franklin | 24/201 |
| 3,623,194 | 11/1971 | Claeson | 24/211 |
| 4,198,080 | 4/1980 | Carpenter | 285/277 |
| 4,404,927 | 9/1983 | Woutat | 119/114 |
| 4,483,683 | 11/1984 | Alley, Sr. | 441/69 |
| 4,530,310 | 7/1985 | Clarke | 119/109 |
| 4,903,638 | 2/1990 | Lacey | 119/114 |

FOREIGN PATENT DOCUMENTS 2809565 9/1979 Fed. Rep. of Germany ...... 119/110

Primary Examiner—John G. Weiss
Attorney, Agent, or Firm—Kenneth W. Iles

[57] ABSTRACT

A remote controlled quick release animal leash includes a solenoid attached to the leash or tether along with a battery pack that powers the solenoid to uncouple a coupling mechanism when a radio signal is transmitted from a remote transmitter to a radio receiver located on the tether. Further, the coupling mechanism can be uncoupled by a cable release having a finger loop near the hand grip of the leash, or by pushing a button on the control box, which is near the hand grip. In an alternative embodiment, a manually operated cable runs from the hand grip to the uncoupling mechanism, which, when actuated, detaches the leash from the animal collar, and hence from the animal.

12 Claims, 3 Drawing Sheets

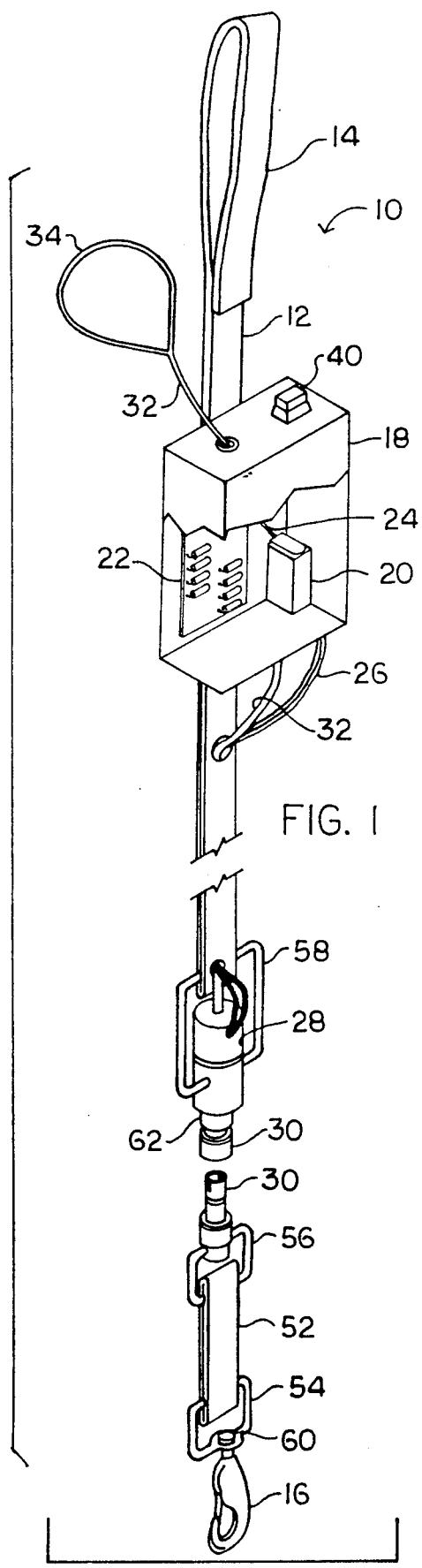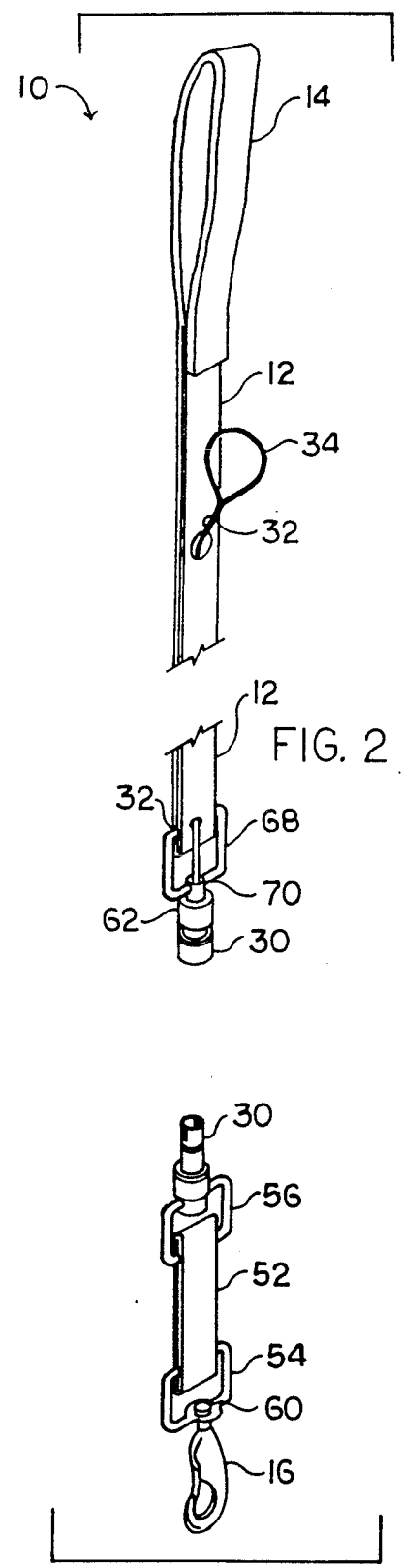

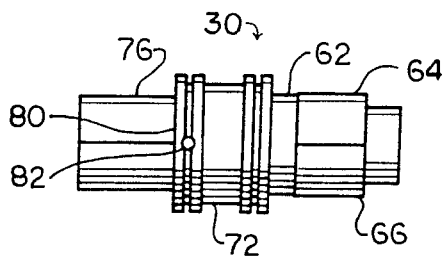
FIG. 3
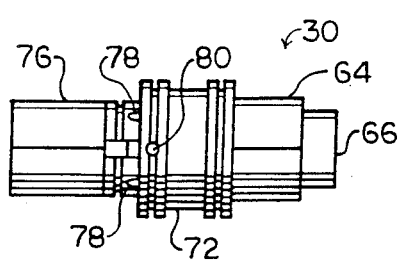
FIG. 4
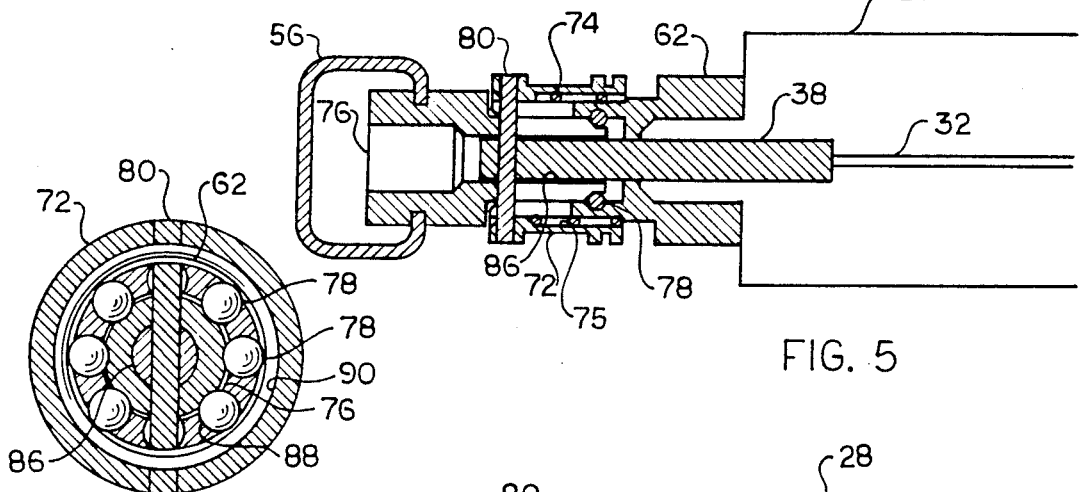
FIG. 5
FIG. 8
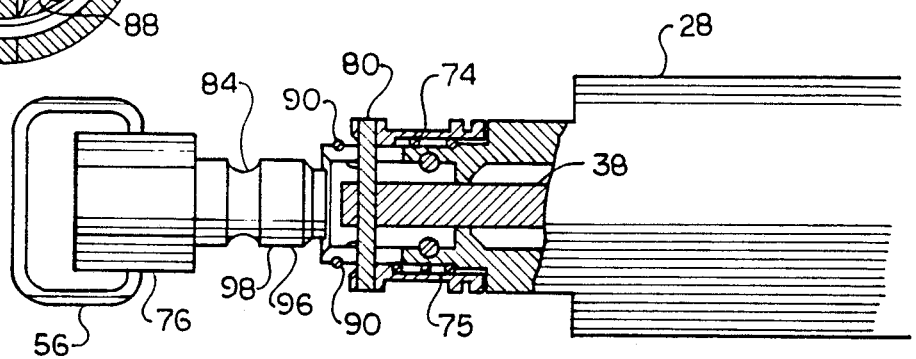
FIG. 6
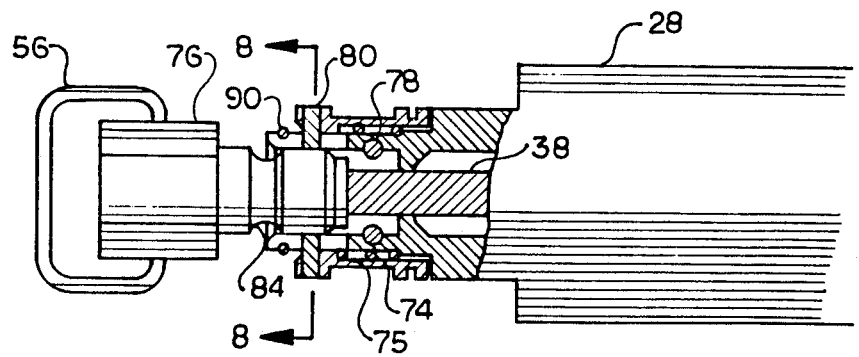
FIG. 7

QUICK RELEASE ANIMAL LEASH

BACKGROUND OF THE INVENTION

1. Field of the Invention

The present invention is directed to an animal leash that can be quickly uncoupled to allow an animal, such as a dog, to be released from the leash. More particularly, the quick release animal leash can be triggered from a hand-controlled release cable attached to the leash or by remote control.

2. The Prior Art

In many applications it is desireable to release an animal from a leash quickly, as for example in working with police dogs. In other applications, such a quick release leash facilitates handling of an animal by persons who cannot readily manipulate a conventional latch for a leash. In other applications, the animal may be too rambunctious for anyone to release a conventional leash latch easily. It may also be desirable to release an animal from its leash from a remote location without having hold of the leash itself. For example, if a guard dog is secured in the owner's backyard and the owner suspects a prowler is in the area, the owner may wish to unleash his guard dog from the safety of his own home.

Accordingly, there is a need for a quick release animal leash that can be easily operated by anyone either by manipulating a device on the leash itself or a remote device to release a latch on the leash and allow the animal to run free.

Numerous prior art solutions to the problem of quickly releasing an animal from a leash that the owner is holding have been attempted. For example, in U.S. Pat. No. 3,099,250, Soles, Jr. discloses an animal leash and collar in which the collar includes a flanged stud having annular groove that is fixed to the collar for receiving a latch member in the lower end of a rigid tube that serves as a leash. By pulling a trigger attached to the handle of the leash, the user can detach the leash-tube from the collar. This leash is rigid and necessarily short.

In U.S. Pat. No. 3,540,089, Franklin discloses a self-releasing animal tether designed to release the animal when a predetermined tensile force is exerted on the collar and leash. The apparatus comprises a ball seated in a socket, with either being slotted so that they can be pulled apart with reasonable force. The force required to separate the ball from the socket can be adjusted. This self-releasing tether only responds to tension forces and cannot release the animal except by physically pulling the two pieces apart. Accordingly, it cannot operate to address the problem set forth above.

In U.S. Pat. No. 4,404,927, Woutat discloses a leash with a latch release that is activated by a switch on the handle of the leash. The leash includes a piston rod which is depressed by the user when he wants to release the dog from the leash. The force generated by the piston when the user pushes on it is transmitted through a hollow core of the flexible leash 10 by a fluid that is sealed into the tubular core member. The force transmitted by the fluid then pushes a second piston located near the collar toward the animal. A shank attached to the piston spreading apart the jaw hooks that engage the anchor ring on the collar and releases the dog. That is, hydraulic fluid is used to transmit a force through the hollow tubular leash to release the latch mechanism. This device is expensive to manufacture because it is unnecessarily complex and may be prone to leak or lack strength. U.S. Pat. No. 4,903,638, discloses a remotely detachable animal leash for use with a collar having an attachment ring to which the leash is attached. The leash includes a hollow passage through with a cord is threaded. Pulling on the cord causes the leash and the collar to separate. A hinged jaw connecting the leash and the collar is thereby opened and the animal, such as a police dog, is released.

The above prior art patents do not allow for truly remote release of the animal, that is, without holding the leash; nor do they disclose a dual release mechanism that can be used either while holding the leash or at a remote distance from the animal and its leash; nor do they disclose such a quick release mechanism that is simple, reliable and simple and inexpensive to manufacture. Accordingly there is a need for such a quick release animal leash.

SUMMARY OF THE INVENTION

Accordingly, it is a primary object of the present invention to provide a quick release animal leash or tether that can be released either from a mechanism on the leash or tether itself or from a remote location.

It is another object of the present invention to provide a quick release animal leash or tether that can be quickly released by a user while he is holding the leash.

It is another object of the present invention to provide a quick release animal leash or tether that can be released by remote control, i.e., without the user holding the leash.

It is another object of the present invention to provide a quick release animal leash or tether that can be released either from a mechanism on the leash itself or by remote control.

It is another object of the present invention to provide a quick release animal leash that is simple, reliable and inexpensive to manufacture.

These and other objects of the present invention will become apparent upon consideration of the detailed description of a preferred embodiment of the invention, taken in conjunction with the drawings.

BRIEF DESCRIPTION OF THE DRAWINGS

FIG. 1 is a perspective view of a remote controlled embodiment of the quick release animal leash equipped with a solenoid for disengaging the leash from the animal.

FIG. 2 is a perspective view of an alternative embodiment of the remote controlled quick release animal leash designed for manual operation.

FIG. 3 is a side elevation of the coupling mechanism used in both embodiments of the quick release animal leash shown in the fully engaged and locked position.

FIG. 4 is a side elevation of the coupling mechanism of FIG. 3 shown with a socket sleeve pulled back toward the tightening nut to permit the coupling mechanism to disengage.

FIG. 5 is side elevation, partially in section, showing the coupling mechanism of FIG. 1 in the fully engaged, that is, locked position.

FIG. 6 is a side elevation, partially in section, of the coupling mechanism of FIG. 1 shown in the disengaged position.

FIG. 7 is a side elevation, partially in section, showing the coupling mechanism of FIG. 1 in a partially engaged position.

FIG. 8 is a cross sectional view taken along lines 8—8 of FIG. 7.

DETAILED DESCRIPTION OF THE PREFERRED EMBODIMENTS

Figure 9:
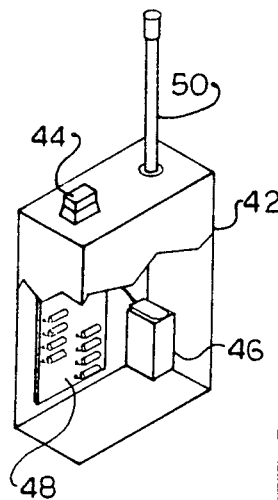
FIG. 9 is a perspective view of a radio transmitter for use with the remote controlled quick release dog leash shown in FIG. 1.

Referring to FIG. 1, there is shown a preferred embodiment of the remote controlled quick release animal leash 10 having a tether 12 terminating at one end in a hand grip 14 consisting of a loop in the hand grip end of the tether 12, which is fastened to the tether 12 by sewing or the like. The tether 12 is an elongated flexible tether made from any conventional material typically used in animal leashes, such as braided fiber, rope, or leather, and is preferably constructed of two layers of such material sandwiched together with a space between them. The hand grip can be held by the user in his hand or can be used to fasten the tether 12 to a fixed object such as a post or to another tether for restraining an animal, such as a dog, without having a person near the animal. The other, or opposite, end of the tether 12 terminates in a latch 16 for attaching the leash 10 to a restraining member, such as a link, on an animal collar fitted about the neck of an animal (not shown). The latch 16 may have a positive closure mechanism to secure the tether 10 to the animal collar (not shown).

Adjacent to the hand grip 14 is a control box 18 housing a battery pack 20, which provides power for a radio receiver 22 housed inside the control box 18, and for a solenoid 28, which actuates a coupling mechanism 30 having two principal parts that couple together in a locked position and separate upon command to disengage the tether from the animal collar (not shown), thereby allowing the animal to run free. The coupling mechanism is discussed in greater detail below. The radio receiver 22 includes an antenna (not shown) housed inside the control box 18 to reduce the potential for damage to it when a vigorous animal is tethered by the leash 10.

A set of wires 24 connects the battery pack 20 to the radio receiver 22, and a set of wires 26 connects the battery pack 20 to the solenoid 28. A cable 32 having a handle or loop 34 that can be easily engaged for pulling by the user's hand or finger enters the control box 18 through an aperture 36, is threaded through the control box 18, the tether 12 and is fastened to the core 38 (see, e.g., FIG. 10) of the solenoid 28, where it serves as a backup or alternative mechanism for disengaging the tether 12 from the animal collar that can be used to release the animal quickly even in the event that the solenoid 28 fails to operate for some reason, such as a discharged battery pack 20. A button switch 40 located on the top of the control box 18 closes the circuit controlling the solenoid 28, actuating the solenoid and causing the coupling mechanism 30 to disengage.

A remotely located radio transmitter 42, shown in FIG. 9, is actuated by a user to broadcast a radio frequency signal by pushing a button switch 44. The radio transmitter 42 has its own battery 46 and transmitting circuitry 48. It includes an external antenna 50. The radio transmitter 42 and the radio receiver 22 may be conventional short range radio transmitter and receiver sets such as those used to activate automatic garage door openers.

The remote controlled quick release animal leash shown in FIG. 1 can be actuated to release the tethered animal in any of three independent methods: (1) by transmitting a radio signal (or other type signal, such as sound waves, laser light beams, infrared light beams, and so forth) from the remotely located radio transmitter 42 shown in FIG. 9 to the radio receiver 22, which causes the solenoid to draw the solenoid core 38 into the solenoid body, thereby disengaging the coupling mechanism 30; (2) by pulling on the finger loop 34 of the cable 32, which mechanically disengages the coupling mechanism 30; or by (3) pushing the button switch 40 at actuate the solenoid 28.

As shown in FIG. 1, the tether 12 includes a short release portion 52 preferably made from the same material as the tether 12 that remains attached to the animal collar by the latch 16 after the coupling mechanism 30 is disengaged. Alternatively, the coupling mechanism may be attached directly to the animal collar by a latch, but it has been found that it is easier to attach the latch 16 to the animal collar if the coupling mechanism 30 is somewhat removed from the latch. A cable 54 is used to attach the latch 16 to the release portion 52 of the tether 12. A second bail 56 attaches the release portion 52 of the tether 12 to the male portion of the coupling mechanism 30. A third bale attaches the solenoid 28 to the lower end of the tether 12, preventing strain on the cable 32 or the wires 26 by insuring that the force exerted on the leash by the dog or other animal is transmitted only through the tether 12, the solenoid 28, the coupling mechanism 30 and the bails 54, 56 and 58. The latch 16 is attached to the bail 54 by a swivel joint 60.

Referring to FIG. 2, there is shown an alternative embodiment of the remote controlled quick release animal leash 10, which is manually operated. The release mechanism is similar to the cable release mechanism described in connection with FIG. 1. Both embodiments share an identical coupling mechanism 30, which is described in detail below. In FIG. 2, the cable 32 is threaded through the socket body 62 of the coupling mechanism 30 where it acts directly on the coupling mechanism 30 to disengage the coupling mechanism 30 when the cable 32 is pulled by the user. In this embodiment, the leash can only be disengaged from the animal collar remotely by a user pulling on the finger loop or handle 34, which requires the user to be near at hand.

Referring to FIG. 3, there is shown the coupling mechanism 30 in the engaged and locked position. A socket body 62 includes a hexagonal locking nut 64 integrally formed therein and a coupling nut 66, which may be threaded and screwed in the locking nut 64 and into which the bail 68 (FIG. 2) is inserted through a pair of opposed apertures 70. A socket sleeve 72 is slipped over a cylindrical body portion of the socket body 62 and is urged away from the locking nut 64 by a coil spring 74 retained in a cylindrical channel 75 between the socket body 62 and the socket sleeve 72 (See, e.g., FIG. 5). A mating male member 76 is inserted into the hollow interior of the socket body 62 and retained by six locking balls 78 (See FIG. 8). A retaining pin 80 is seated in a pair of opposing apertures 82 across a diameter of the socket sleeve 72 to allow a force exerted through the hollow body of the socket body 62 to be transmitted to the socket sleeve 72, thereby pulling the socket sleeve 72 toward the locking nut 64, which releases the locking balls 78 from the mating male member 76, allowing it to disengage from the socket body 62. The retaining pin 80 penetrates the motive pin 86 through a transverse aperature in the motive pin 86. FIG. 4 illustrates the coupling mechanism with the socket sleeve 72 pulled back to the locking nut 64, which exposes the locking balls 78 on the outside of the socket body 62 and allows the locking balls 78 to protrude a small distance beyond the socket body 62 without falling out, thereby disengaging the locking balls 78 from the circumferential channel 84 of the male member 76 (See, e.g., FIG. 6).

Referring to FIG. 5, the solenoid 28 includes the core 38, which is drawn into the solenoid 28 when the coil of the solenoid is energized by passing an electrical current from the battery pack 20 through it. A portion of the core 28, consisting of the motive pin 86, passes through the hollow interior portion of the socket body 62 along and parallel to the longitudinal axis or centerline of the socket body 62. The retaining pin 80, which may be a rolled pin, is pressed through a perpendicular aperture 88 in the motive pin 86. Opposed apertures 82 in the socket sleeve each receive one end of the retaining pin 80.

In operation, when the solenoid 28 is actuated the core 38 is drawn toward the right in FIGS. 5, 6, and 7, thereby drawing the socket sleeve 2 toward the locking nut 64. The solenoid 28 is fastened to the socket body 62 by any convenient means, such as threads, welding, gluing and the like.

As shown in FIG. 5, the locking balls 78 are seated in the channel 75 of the mating male member 76. As the motive pin 86 portion of the core 38 is drawn back, the locking balls move outward along the exposed surface of the socket body 62, freeing them from the channel 75 and allowing the male member 76 to be withdrawn from the socket body 62. FIG. 7 illustrates the male member 76 in the process of becoming disengaged from the socket body 62 and FIG. 6 shows the two parts of the coupling mechanism completely separated. Referring to FIG. 8, each locking 78 is seated in an aperture 88 sized to allow each locking ball 78 to fall toward the outer surface of the socket body 62 without falling out of the hole it is seated in. The apertures 88 are circumferentially spaced about the socket body 62. A retaining clip 90 (See, e.g., FIG. 6) seated in a groove 92 prevents the socket sleeve 72 from slipping off the free end 94 of the socket body 62 when the male member 76 is disengaged from the coupling mechanism 30.

Returning now to the manually operated embodiment illustrated in FIG. 2, the coupling mechanism 30 is identical to the coupling mechanism of the electrically remote controlled embodiment of FIG. 1 except that there is no solenoid. Instead, the cable 32 is fastened directly to the motive pin 86.

Figure 10:
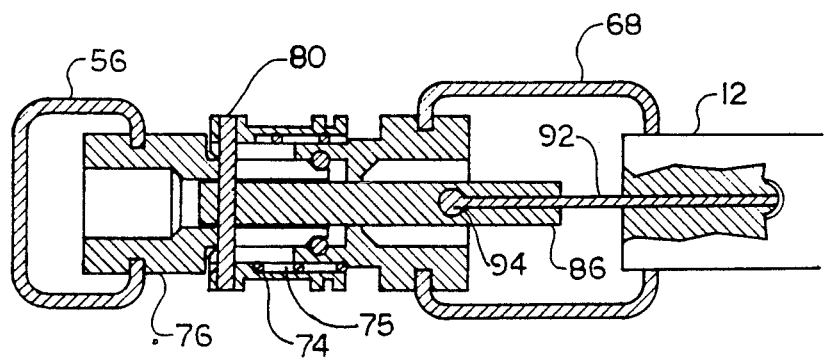
FIG. 10 is a cross sectional elevation of the coupling mechanism of FIG. 2 shown in the fully engaged and locked position.

Referring to FIG. 10, the motive pin 86 includes a substantially cylindrical bore 92 lying along the longitudinal center line of the motive pin 86. An end of the cable 32 is inserted into the cylindrical bore 92 and fastened therein by silver solder 94 or the like. The cable end 32 is fastened to the core 38 of the solenoid 28 in the same manner.

Figure 11:
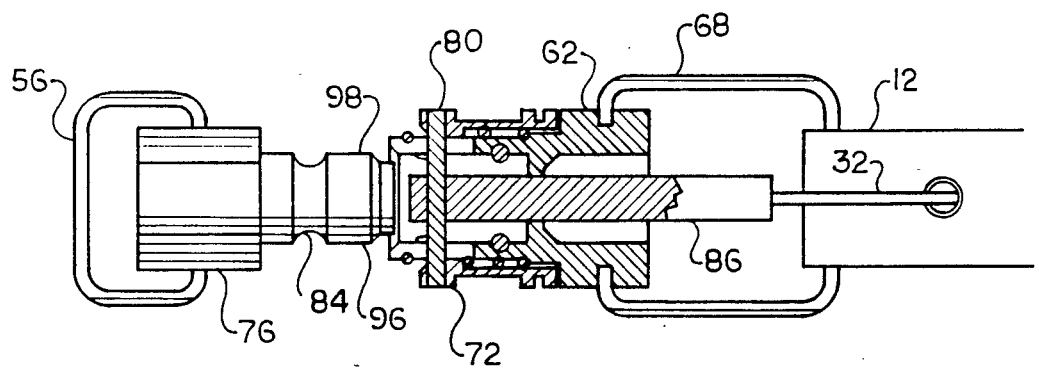
FIG. 11 is a cross sectional elevation of the coupling mechanism of FIG. 2 shown in a disengaged position.
Figure 12:
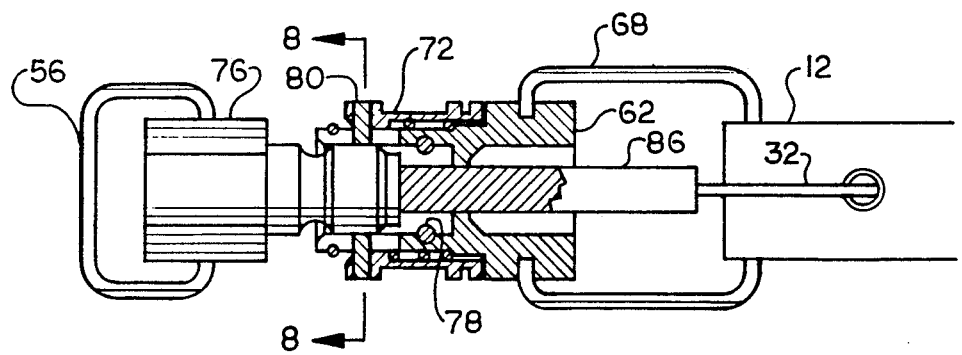
FIG. 12 is a cross sectional elevation of the coupling mechanism of FIG. 2 shown in a partially disengaged position.

Referring, for example, to FIG. 6 or 11, the locking portion 96 of the male member 76, i.e., the portion near the circumferential channel 84, includes a hollow inner core 98 to accommodate the motive pin 86 and a transverse slot 100 to accommodate retaining pin 80. The retaining pin 80, best shown in FIG. 8, is received in the matching transverse slot 100 to allow the male member 76 to be received by the socket body 62.

Either of the preferred embodiments disclosed herein can be made from a variety of materials and the operative mechanisms, especially the specific operation of the coupling mechanism 30, may take a variety of specific configurations. For example, when the quick release animal leash is equipped with a radio controlled release mechanism, it is especially suited for use with a long tether that allows the animal to roam over a considerable area. In this case, the control box 18 can be conveniently fixed to the side of a building, such as the owner's house, a garage, dog house, or the like to reduce wear and tear on the control box 18 as the animal runs about, tugging on the tether 12, which can conveniently be attached to the same structure. In this case, the cable 32 may be omitted if desired, and the electrical wires 26 are extended so they still connect the control box 18 with the solenoid 28. A strain relief (not shown) for the wires 26 is included so that the tether 12 can be pulled tightly without pulling on the wires 26. In addition, it is desireable in this case to provide a waterproof control box 18 and solenoid 28, which may be coated with waterproof plastic or the like.

Although the invention has been described in considerable detail, various modifications of the invention may occur to those skilled in the art. Accordingly, the scope of the patent property to be granted should be limited solely to claims that follow.

I claim:

1. A leash for an animal comprising:
   a. a flexible tether having a hand grip adjacent to one end of said tether;
   b. means for releasing an animal collar from said tether fastened to said tether adjacent to the other end of said tether, said collar release means further comprising a socket body having a plurality of circumferentially spaced apertures and one locking ball seated in each of a plurality of said apertures and means for retaining said locking balls in said apertures, a mating male coupling member having a circumferential groove that said locking balls seat in when said male member is inserted into said socket body member, whereby said male coupling member is released from locking engagement with said socket body when said locking ball retaining means is pulled away from said male coupling member;
   c. a cable release means attached to said tether running from said hand grip to said collar release means and fastened thereto;
   d. whereby when said cable release means is pulled said collar release means uncouples, disconnecting said tether from said animal collar.

2. A leash for an animal according to claim 1 wherein said cable release means further comprises a cable having one end fixed to a motive pin inserted through said socket body along a central longitudinal axis of said socket body, a retaining pin perpendicular to and penetrating said motive pin and engaging two opposing apertures in said socket sleeve, whereby when said cable is pulled, said socket sleeve is pulled away from said male connector, whereby said cable release means separates.

3. A leash for an animal according to claim 1 further comprising a latch means fastened to said male coupling member.

4. A leash for an animal according to claim 1 further comprising a strap fastened at one end to said male connector by a bail and fastened to a latch means at the other end by a second bail.

5. A leash for an animal according to claim 1 wherein said locking ball retaining means further comprises a socket sleeve movably seated on the exterior surface of said socket body, means for retaining said socket sleeve on said socket body and means for urging said socket sleeve toward said locking balls.

6. A leash for an animal comprising:
  a. a flexible tether having a hand grip adjacent to one end of said tether;
  b. means for releasing an animal collar from said tether fastened to said tether adjacent to the other end of said tether, said collar release means further comprising a socket body having a plurality of circumferentially spaced apertures and one locking ball seated in each of a plurality of said apertures and means for retaining said locking balls in said apertures, said locking ball retaining means further comprising a socket sleeve, a mating male coupling member having a circumferential groove that said locking balls seat in when said male member is inserted into said socket body member, whereby said male coupling member is released from locking engagement with said socket body when said socket sleeve is pulled away from said male coupling member;
  c. a cable release means comprising a cable having one end fixed to a motive pin inserted through said socket body along a central longitudinal axis of said socket body, a retaining pin perpendicular to and penetrating said motive pin and engaging two opposing apertures in said socket sleeve, said cable release means running from said socket body to said hand grip;
  d. a latch means fastened to said male coupling member for securing said tether to an animal collar;
  e. whereby when said cable release means is pulled said collar release means uncouples, disconnecting said tether from the animal collar.

7. A leash for an animal according to claim 6 wherein said locking ball retaining means further comprises a socket sleeve movably seated on the exterior surface of said socket body, means for retaining said socket sleeve on said socket body and means for urging said socket sleeve toward said locking balls.

8. A leash for an animal according to claim 6 wherein said cable release means further comprises a handle means at the end of said cable release means adjacent to said tether hand grip.

9. A leash for an animal comprising:
  a. a flexible tether having a grip adjacent to one end of said tether, said grip being adapted for fastening to a fixed retaining means;
  b. means for releasing an animal collar from said tether fastened to said tether adjacent to the other end of said tether, said collar release means further comprising a solenoid having a core;
  d. means for powering said solenoid attached to said tether and electrically connected to said solenoid; and
  e. means for signalling said powering means to actuate said solenoid from a remote location.

10. A leash for an animal according to claim 9 wherein said powering means further comprises a battery pack.

11. A leash for an animal according to claim 9 wherein said signalling means further comprises a radio receiver attached to said strap and electrically connected to said powering means, and a remotely located radio transmitter for transmitting a radio signal to said receiver, whereby said solenoid is actuated and said tether is disengaged from said collar.

12. A leash for an animal according to claim 9 further wherein said collar release means further comprises a socket body attached to said solenoid, said socket body further comprising a plurality of circumferentially spaced apertures and one locking ball seated in each of a plurality of said apertures and means for retaining said locking balls in said apertures, said locking ball retaining means comprising a socket sleeve, a mating male coupling member having a circumferential groove that said locking balls seat in when said male member is inserted into said socket body member, whereby said male coupling member is released from locking engagement with said socket body when said locking ball retaining means is pulled away from said male coupling member;
  c. a cable release means attached to said tether running from said hand grip to said collar release means and fastened to said solenoid core, a motive pin comprising a portion of said solenoid core inserted through said socket body along a central longitudinal axis of said socket body, a retaining pin perpendicular to and penetrating said motive pin along a portion of said motive pin lying within said socket body and engaging two opposing apertures in said socket sleeve, whereby when said cable is pulled, said socket sleeve is pulled away from said male connector, whereby said cable release means separates.

* * * * *